Figure 1:
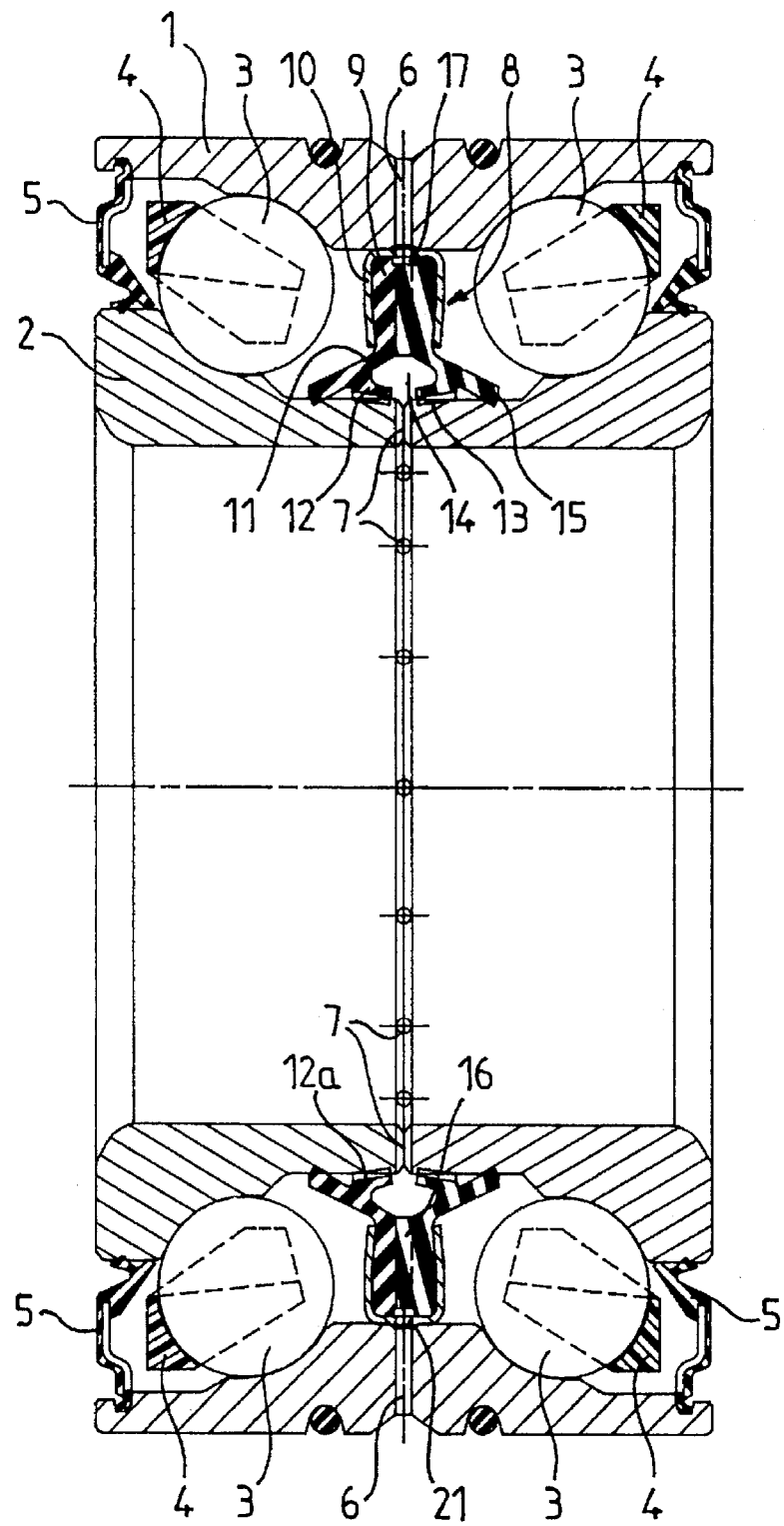

United States Patent [19]

Caillault et al.

[11] Patent Number: 5,642,946
[45] Date of Patent: Jul. 1, 1997

[54] ROLLING-CONTACT BEARING EQUIPPED WITH A SEALING DEVICE FOR THE PASSAGE OF FLUID

[75] Inventors: Claude Caillault, Saint-Roch; Christophe Houdayer, Tours, both of France

[73] Assignee: SKF France, France

[21] Appl. No.: 546,264

[22] Filed: Oct. 20, 1995

[30] Foreign Application Priority Data

Nov. 17, 1994 [FR] France ................................ 94 13778

[51] Int. Cl.$^6$ ................................................ F16C 33/78
[52] U.S. Cl. ................................................ 384/486; 384/477
[58] Field of Search ................................... 384/486, 477, 384/485, 484, 147, 148

[56] References Cited

FOREIGN PATENT DOCUMENTS

| 0410723 | 1/1991 | European Pat. Off. . |
| 0362921 | 4/1991 | European Pat. Off. . |
| 0649762 | 4/1995 | France . |
| 0656267 | 6/1995 | France . |

*Primary Examiner*—Lenard A. Footland

*Attorney, Agent, or Firm*—Beveridge, DeGrandi, Weilacher & Young, L.L.P.

[57] ABSTRACT

Rolling-contact bearing equipped with a sealing device for the passage of a fluid. The bearing comprises a rotating race and a non-rotating race, through each one of which there pass channels (6,7) for the passage of fluid, rolling bodies (3) between the rotating race and non-rotating race, and a sealing device (8) mounted between the rotating race and non-rotating race to form a sealed intermediate chamber (14) communicating with the channels (6,7) for the passage of the fluid. The intermediate chamber has two flexible walls (11), the free end parts of which form two sealing lips (12) in rubbing contact with a bearing surface (13) of one of the races (2) of the bearing. The sealing device (8) comprises two coaxial seals made of a flexible material and held against each other by means of a metal reinforcing member (10), each of the seals comprising a ring of axial teeth (16) separated from one another by circumferential gaps. The dimensions of the teeth and of the gaps separating them are such that when the two seals of the device are held against each other, the teeth of one of the seals of the device penetrate between the teeth of the other seal of the device forming radial channels (23) for the flow of fluid through the device.

20 Claims, 3 Drawing Sheets

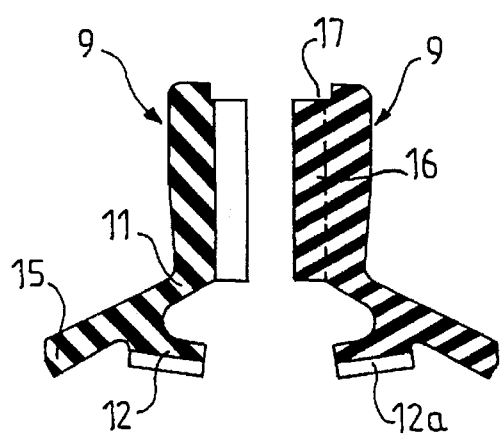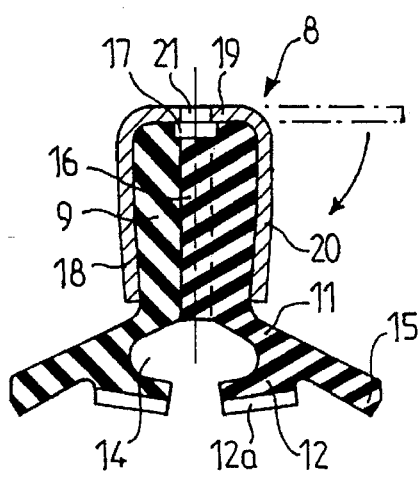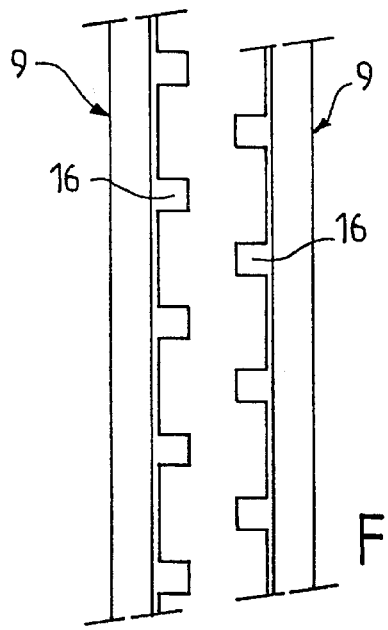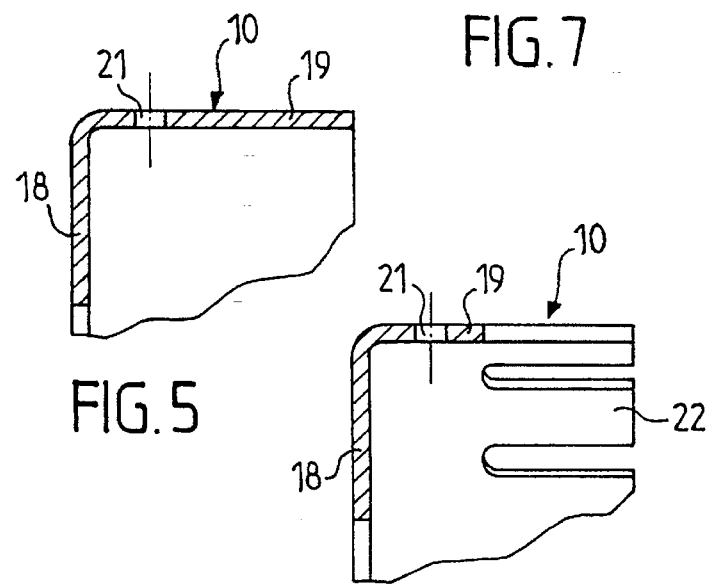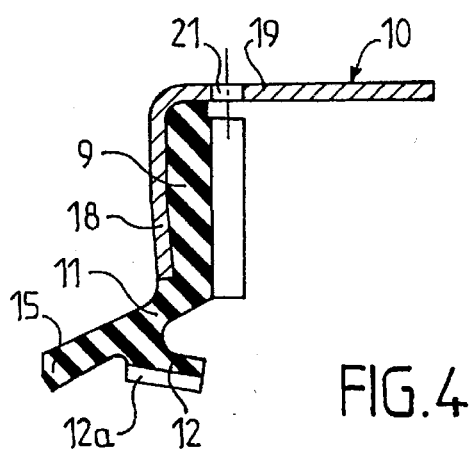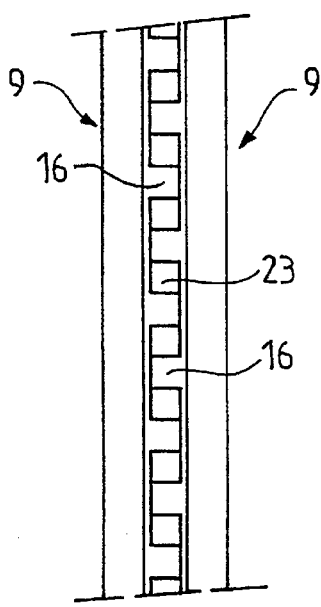

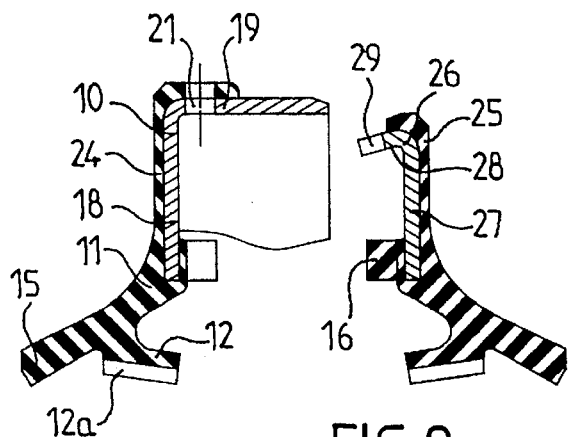
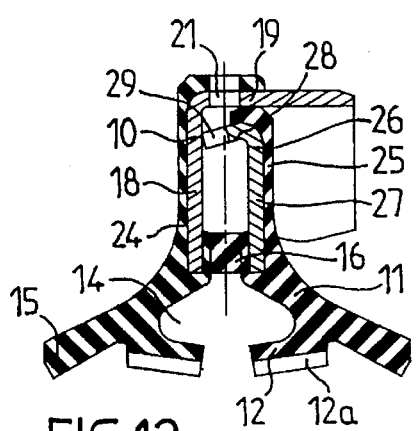
FIG.9  FIG.12
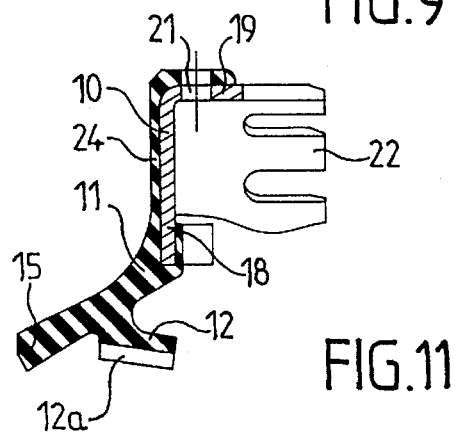
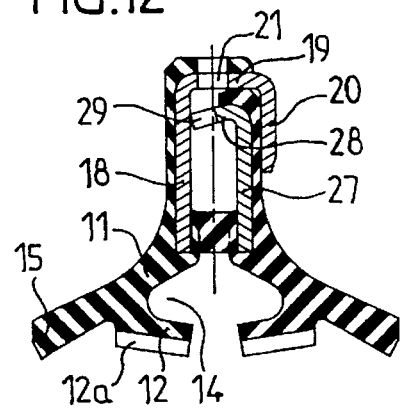
FIG.11  FIG.13
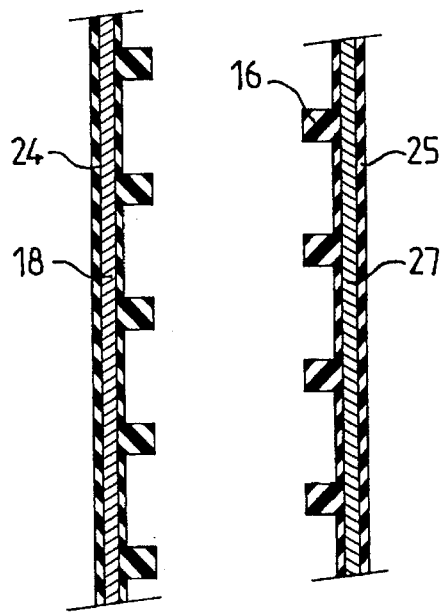
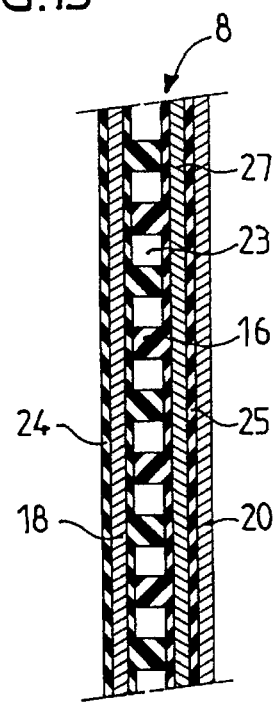
FIG.10  FIG.14

ROLLING-CONTACT BEARING EQUIPPED WITH A SEALING DEVICE FOR THE PASSAGE OF FLUID

The present invention relates to the field of sealing for the passage of a fluid between two components, one of which has a rotational movement imparted to it with respect to the other. In particular, the invention relates to a rolling-contact bearing equipped with a fluid passage which passes through the rotating race and non-rotating race of the bearing, and to a sealing device for the passage of the fluid through the bearing.

European Patent Application 0,362,921 (SKF) makes known a rolling-contact bearing equipped with a sealing device mounted between two rows of balls and between the orifices made on the outer race and the orifices made on the inner race of the bearing so as to give a passage for a fluid through the bearing. This bearing makes it possible to set up a communication between two chambers containing a pressurized fluid. The sealing device on the one hand allows the passage of fluid through the bearing and on the other hand prevents the bearing lubricant such as grease from penetrating the regions via which the fluid passes through the bearing. This sealing device does however display a significant axial size, which may be incompatible with some applications.

A common application of this technique is intended for monitoring and regulating the pressure of tires on a vehicle, the sealing device for the passage of fluid being mounted in the wheel bearings of the vehicle.

The U.S. Pat. No. 4,844,138 makes known a device for the passage of air through a rolling-contact bearing by means of fluidic seals. This highly sophisticated device is too extensive for mass production.

Other devices for passing air through a wheel hub are also known, making use of a pair of seals to provide the sealed passage of air between the rotating part and fixed part of the hub (see for example European Patent Applications 0,204,085 and 0,208,540). Each seal includes a metal reinforcing member on which a sealing lip is overmoulded. The seals are secured to the stationary part of the hub via their metal reinforcing member, their sealing lips being in rubbing contact with a cylindrical bearing surface formed on the rotating part of the hub. Each sealing lip is supported by an axial portion of the seal which has a certain degree of flexibility in the radial direction. Thus, the pressure exerted by the fluid on this axial portion supporting the sealing lip is manifested by a certain pressure with which the sealing lip contacts the cylindrical bearing surface of the rotating part in addition to the contact pressure due to the mechanical prestress of the sealing lip on the cylindrical bearing surface.

However, the presence of an axial portion for each seal for supporting its sealing lip creates a significant axial size which may prove incompatible with some applications.

Furthermore, separate seals nearly always have to have a device for axially locking the seals together to prevent them from shifting under the effect of the pressure.

One means of avoiding any risk of axial shifting of the seals under the effect of the pressure of the fluid consists in using a single piece seal equipped with radial channels passing through the central body of the seal as is described in French Patent FR 93 12 517 (SKF).

Manufacture of such a type of seal may, however, prove tricky as regards the design of the moulds, and release of the components from the mould.

The object of the present invention is to overcome the aforementioned drawbacks of the existing techniques by proposing a rolling-contact bearing equipped with an effective and economic sealing device exhibiting a reduced axial size to allow it to be incorporated easily into the rolling-contact bearing and without the risk of it rotating as a result of rubbing of the sealing lips on their rubbing bearing surface or it shifting axially under the effect of the pressure.

The sealing device is located between a rotating race and a non-rotating race of a rolling-contact bearing so as to allow the passage of a fluid between the said races each of which has channels passing through it for the passage of the fluid. A sealed intermediate chamber of annular shape is thus formed between the rotating race and non-rotating race of the bearing and communicates with the fluid passage channels of the said races. The sealing device is mounted stationary on one of the races which may be the rotating race or the non-rotating race, the intermediate chamber being extended towards the other race by flexible walls, the end part of which constitutes a sealing lip which is in rubbing contact with respect to a bearing surface of the other race of the rolling-contact bearing.

According to the invention, the sealing device comprises two coaxial seals made of a flexible material which are held against each other by means of a metal reinforcing member. Each of the coaxial seals comprises a ring of axial teeth separated from each other by circumferential gaps. The dimensions of the teeth and of the gaps which separate them are such that when the two seals of the device are held against each other, the teeth of one of the seals of the device penetrate between the teeth of the other seal of the device forming radial channels for the flow of fluid through the device.

The crest of the teeth of one of the seals of the device comes to bear against the second seal between the teeth of the said second seal. The metal reinforcing member is pierced with orifices for the passage of the fluid between the channels of the outer race and the radial channels of the device. Each seal is equipped with an annular groove situated on its outer perimeter, between the orifices of the metal reinforcing member and the channels formed between the teeth of the two seals of the device so that the fluid flows between the said orifices and the said channels. The metal reinforcing member comprises a radial portion connected to a cylindrical portion pierced with holes for the passage of the fluid, and a second radial portion substantially parallel to the first radial portion and formed by knocking over the free end of the said cylindrical portion.

Advantageously, the free end of the cylindrical portion of the metal reinforcing member is cut into a plurality of axial tabs designed to be knocked over so as to form a second radial portion substantially parallel to the first radial portion of the metal reinforcing member.

One of the seals of the sealing device may be overmoulded on the metal reinforcing member.

Advantageously, the sealing device comprises a second metal reinforcing member on which the second seal of the sealing device is overmoulded. This second metal reinforcing member comprises a radial portion which is extended by an axial portion coming to bear against the radial portion of the first metal reinforcing member and equipped with orifices for the passage of the fluid.

The sealing lips of the sealing device may, in their rubbing region, include an antifriction coating exhibiting better rubbing and sealing properties by comparison with the rest of the lips. The product known by the name of TEFLON is highly satisfactory in this respect. Advantageously, the flexible walls of the intermediate chamber also display two secondary outer sealing lips for the lubricant contained within the bearing. The secondary sealing lips make it possible to protect the rubbing regions of the lips for sealing to the fluid against the lubricant of the bearing.

The invention will be better understood from studying the detailed description of a few embodiments taken without any implied limitation, and illustrated by the appended drawings, in which:

FIG. 1 is an axial section of a rolling-contact bearing equipped with a sealing device according to a first embodiment of the invention, FIG. 2 is a partial axial section of a sealing device before assembly, FIG. 3 is an elevation of an unrolled sealing device, FIG. 4 is a partial axial section of a seal according to a second embodiment of the invention, FIG. 5 is a partial axial section of the metal reinforcing member, FIG. 6 is a view similar to FIG. 5 representing another embodiment of the invention, FIG. 7 is a partial axial section of a sealing device during assembly, FIG. 8 is a view similar to FIG. 3 showing the sealing device after assembly, FIG. 9 is a partial axial section of a sealing device before assembly according to a third embodiment of the invention, FIG. 10 is a partial section of an unrolled sealing device before assembly, FIG. 11 is a view similar to FIG. 9 according to another embodiment of the invention, FIGS. 12 and 13 are views similar to FIG. 9 showing the sealing device during assembly, and FIG. 14 is a view similar to FIG. 10 of the sealing device after assembly.

The rolling-contact bearing illustrated in FIG. 1 comprises an outer race 1, an inner race 2 formed by two half-races butted together axially, and two rows of bearing balls 3 which are spaced apart circumferentially by cages 4. The outer race 1 and the inner race 2 may have a rotational movement imparted to them one with respect to the other. The outer race 1 may be stationary or rotating.

The bearing is protected from the external environment by two annular lateral seals 5. In a radial plane situated between the two rows of balls 3 there are several radial outer channels 6 passing through the outer race 1 of the bearing, and several radial inner channels 7 passing through the inner race 2 of the bearing. In the annular space formed by the outer race 1 and inner race 2 and the two rows of balls 3 there is mounted a sealing device 8 allowing a fluid to pass between the outer channels 6 and inner channels 7 of the bearing.

The sealing device 8 is formed in this example of two annular separate parts or seals 9 which are mounted facing each other axially in a symmetric fashion with respect to the radial plane passing through the outer channels 6 and inner channels 7 of the bearing races. The seals 9 will be made of a flexible material such as rubber or an elastomer. Each sealing device 8 comprises a metal reinforcing member 10 formed by a steel sheet which has been pressed so that it exhibits a cylindrical part 19 to be pushed axially onto the outer race 1 of the bearing and two parts 18 and 20 for the radial reinforcement of each seal. The cylindrical part 19 of the metal reinforcing member 10 is pierced with holes 21 to allow the fluid to pass between the channels 6 and the inside of the said metal reinforcing member. Each seal 9 is extended by way of a flexible wall 11, the free end of which constitutes a lip 12 for rubbing contact with an annular bearing surface 13 formed on the inner race 2 of the bearing.

The two seals 9 thus mounted delimit an annular intermediate chamber 14 for the passage of the fluid, the intermediate chamber 14 communicating with the inner fluid passage channels 7. Hence, the two seals 9 of the sealing device 8 are held against each other by the metal reinforcing member. Each seal 9 comprises a ring of axial projections in the form of teeth 16 separated from each other by circumferential gaps 23, the dimensions of the teeth and of the gaps which separate them being such that when the two seals are joined together, the teeth of one seal penetrate between the teeth of the other seal, forming radial channels 23 (FIG. 8) for the flow of the fluid. The bearing surfaces 13 of the inner race 2, for rubbing contact, are symmetrical with respect to the radial plane passing through the outer channels 6 and inner channels 7. Any variation in the pressure of the fluid on the internal faces of the flexible walls 11 is manifested by a variation in the same direction of the pressure with which the sealing lips 12 contact the bearing surfaces 13.

In order to improve the rubbing properties between the sealing lips 12 and the bearing surfaces 13 for rubbing contact, the regions for rubbing contact of the sealing lips 12 are equipped with an antifriction coating 12a, for example made of TEFLON, which displays mechanical properties which are better than rubber or than the elastomer forming the rest of the sealing lips 12. Sealing lips 15 may also be provided so as to protect the sealing lips 12 from the grease used to lubricate the bearing balls 3. The secondary sealing lips 15 may consist of two annular tabs on the outside of the flexible walls 11. These secondary tabs 15 extend obliquely and are in rubbing contact with cylindrical bearing surfaces of the inner race 2.

FIGS. 2 and 3 show the two seals 9 of the sealing device 8 before assembly according to an embodiment identical to that of FIG. 1. The two seals 9 of the sealing device 8 comprise a plurality of axial teeth 16. During assembly, the two seals 9 are placed so that the teeth 16 of one of the seals penetrate the gap between two teeth 16 of the other seal.

A second embodiment of the invention is represented in FIG. 4. The seal 9 is made by overmoulding an elastomer or similar flexible material directly onto the metal reinforcing member 10 which is identical to the one described in the first embodiment. The external face of the seal 9 matches the internal contour of the metal reinforcing member. The complementary seal would be identical to the seal 9 of FIG. 2.

FIG. 5 shows a metal reinforcing member as it is before assembly. The metal reinforcing member 10 comprises a radial part 18 and a cylindrical axial part 19 which may be pushed into the outer race 1. A plurality of holes 21 are pierced in the cylindrical part 19 so as to allow the fluid to pass through the metal reinforcing member 10.

FIG. 6 shows a metal reinforcing member 10 according to another embodiment of the invention. The free end of the cylindrical part 19 is cut into a plurality of tabs 22 to make it easier to knock the said tabs down into a radial position to form the second radial part of the metal reinforcing member 10.

FIG. 7 shows a sealing device 8 as it is after assembly. The teeth 16 of one of the seals 9 of the sealing device 8 come into contact with the other seal of the sealing device 8. The metal reinforcing member 10, once the free end of its cylindrical part 19 has been knocked down into a radial position to form a second radial part 20, keeps the two seals 9 of the sealing device 8 in contact with each other. The teeth 16 of one of the seals 9 penetrate the gap left between the teeth of the other seal. Each seal 9 is provided with an annular groove 17 on its outer perimeter so as to allow the fluid to pass between the orifices 21 of the metal reinforcing member 10 and the channels 23 formed between the teeth 16 of each seal 9.

FIG. 8 shows the configuration of the radial channels once the seals have been assembled. The gap left empty between each tooth 16 thus forms a radial channel 23 allowing the fluid to pass. The teeth 16 are of rectangular shape, mutual imbrication of the teeth of the seals thus making it possible to prevent any relative circumferential slippage between the two seals 9.

FIGS. 9 and 10 show a sealing device 8 according to a third embodiment of the invention, as it is before assembly. The metal reinforcing member 10 is identical to the one of the embodiment described previously. The first seal 24 of the sealing device 8 is overmoulded on the metal reinforcing member 10 and comprises a flexible wall 11, a sealing lip 12 equipped with an antifriction coating 12a, a secondary sealing lip 15 and a plurality of teeth 16. The sealing device 8 comprises a second metal reinforcing member 26 on which the second seal 25 is overmoulded, which second seal also includes a flexible wall 11 with a sealing lip 12 equipped with an antifriction coating 12a, a secondary sealing lip 15 and a plurality of teeth 16. The second metal reinforcing member 26 comprises a radial portion 27 and an axial portion 28 forming a spacer piece and, upon assembly, coming to bear against the radial part 18 of the metal reinforcing member 10. The axial part 28 is equipped with a plurality of orifices 29 so that the fluid can flow.

FIG. 11 shows an alternative form of the metal reinforcing member 10 of the sealing device 8. The free end of the cylindrical part 19 is cut into a plurality of tabs 22 which can easily be knocked down to form a second radial part 20.

FIG. 12 shows the sealing device 8 after the two seals have been brought together. The teeth 16 of the two seals intermesh and come to bear against the walls of the other seal. The axial part 28 of the metal reinforcing member 27 also comes to bear against the radial part 18 of the metal reinforcing member 10.

FIG. 13 shows the device 8 after the free end of the cylindrical part 19 has been knocked down. The knocked down free end of the cylindrical part 19 forms a second radial part 20 which tightly holds the second seal 25 of the sealing device 8.

FIG. 14 shows the sealing device 8 after assembly. The teeth 16 of the two seals 24 and 25 define between them channels 23 for the passage of the fluid. The second radial part 20 of the metal reinforcing member 10 once knocked down prevents any axial movement of the second seal 25 of the sealing device 8.

In all the embodiments of the invention, it is possible to select a rigidity of the flexible wall 11 supporting the sealing lips 12 so that a minimum contact pressure is ensured between the sealing lip 12 and the bearing surface 13 for rubbing contact, even for low fluid pressures inside the intermediate chamber 14.

Thus produced, the sealing device is simple to manufacture and has a small size and may be mounted in rolling-contact bearings without any risk of the seals shifting.

We claim:

1. A rolling-contact bearing, comprising:
   a rotating race and a non-rotating race, each defining a channel for the passage of fluid;
   a plurality of rolling bodies positioned between the rotating race and the non-rotating race; and
   a sealing device mounted between the rotating race and the non-rotating race and defining a sealed intermediate chamber in communication with the channels for the passage of the fluid,
   wherein, the sealing device comprises two flexible coaxial seals held against each other by means of a metal reinforcing member, each of the seals comprising a ring of axial teeth separated from each other by circumferential gaps, the dimensions of the teeth and of the gaps being such that when the two seals of the sealing device are held against each other, the teeth of one of the seals are disposed between the teeth of the other seal of the device and form radial channels for the flow of fluid through the sealing device.

2. The roller-contact bearing according to claim 1, wherein the crest of the teeth of one of the seals of the device contacts the second seal of the device between the teeth of the second seal.

3. The roller-contact bearing according to claim 1, wherein the teeth of the two seals of the device have a rectangular section.

4. The rolling-contact bearing according to claim 1, wherein the metal reinforcing member is pierced with orifices for the passage of the fluid and each seal of the device is equipped with an annular groove situated between the orifices and the channels formed between the teeth of the two seals of the device such that fluid flows between the orifices and the channels.

5. The rolling-contact bearing according to claim 1, wherein the metal reinforcing member comprises a radial portion connected to a cylindrical portion pierced with holes for the passage of fluid, and a second radial portion substantially parallel to the first radial portion and formed by deforming a free end of the cylindrical portion.

6. The rolling-contact bearing according to claim 5, wherein the free end of the cylindrical portion is cut into a plurality of axial tabs which are designed to be deformed such that a second radial portion is formed substantially parallel to the first radial portion of the metal reinforcing member.

7. The rolling-contact bearing according to claim 1, wherein at least one of the seals of the sealing device is overmoulded on the metal reinforcing member.

8. The rolling-contact bearing according to claim 7, wherein the sealing device comprises a second metal reinforcing member on which the second seal of the sealing device is overmoulded, the second metal reinforcing member comprising a radial portion extended by an axial portion contacting the radial portion of the first metal reinforcing member and defining orifices for the passage of the fluid.

9. Sealing device for the passage of a fluid through a rolling-contact bearing according to claim 1, wherein the sealing device further comprises two secondary sealing lips in rubbing contact with a cylindrical bearing surface of the inner race to protect the sealing lips from the grease used to lubricate the rolling elements of the bearing.

10. Sealing device according to claim 9, wherein parts of the sealing lips which are in rubbing contact with the inner race of the rolling-contact bearing are equipped with an antifriction coating.

11. The roller-contact bearing according to claim 2, wherein the teeth of the two seals of the device have a rectangular section.

12. The rolling-contact bearing according to claim 2, wherein the metal reinforcing member is pierced with orifices for the passage of the fluid and each seal of the device is equipped with an annular groove situated between the orifices and the channels formed between them teeth of the two seals of the device such that fluid flows between the orifices and the channels.

13. The rolling-contact bearing according to claim 3, wherein the metal reinforcing member is pierced with orifices for the passage of the fluid and each seal of the device is equipped with an annular groove situated between the orifices and the channels formed between the teeth of the two seals of the device such that fluid flows between the orifices and the channels.

14. The rolling-contact bearing according to claim 2, wherein the metal reinforcing member comprises a radial portion connected to a cylindrical portion pierced with holes for the passage of fluid, and a second radial portion substantially parallel to the first radial portion and formed by deforming a free end of the cylindrical portion.

15. The rolling-contact bearing according to claim 3, wherein the metal reinforcing member comprises a radial portion connected to a cylindrical portion pierced with holes for the passage of fluid, and a second radial portion substantially parallel to the first radial portion and formed by deforming a free end of the cylindrical portion.

16. The rolling-contact bearing according to claim 4, wherein the metal reinforcing member comprises a radial portion connected to a cylindrical portion pierced with holes for the passage of fluid, and a second radial portion substantially parallel to the first radial portion and formed by deforming a free end of the cylindrical portion.

17. The rolling-contact bearing according to claim 2, wherein at least one of the seals of the sealing device is overmoulded on the metal reinforcing member.

18. The rolling-contact bearing according to claim 3, wherein at least one of the seals of the sealing device is overmoulded on the metal reinforcing member.

19. The rolling-contact bearing according to claim 4, wherein at least one of the seals of the sealing device is overmoulded on the metal reinforcing member.

20. The rolling-contact bearing according to claim 5, wherein at least one of the seals of the sealing device is overmoulded on the metal reinforcing member.

* * * * *